Aug. 7, 1962  E. L. CHADWICK  3,047,999
ROTO-EDGER TOOL

Filed Jan. 21, 1960  2 Sheets-Sheet 1

INVENTOR
EARL L. CHADWICK

BY *Cushman, Darby & Cushman*
ATTORNEYS

Aug. 7, 1962   E. L. CHADWICK   3,047,999
ROTO-EDGER TOOL
Filed Jan. 21, 1960   2 Sheets-Sheet 2
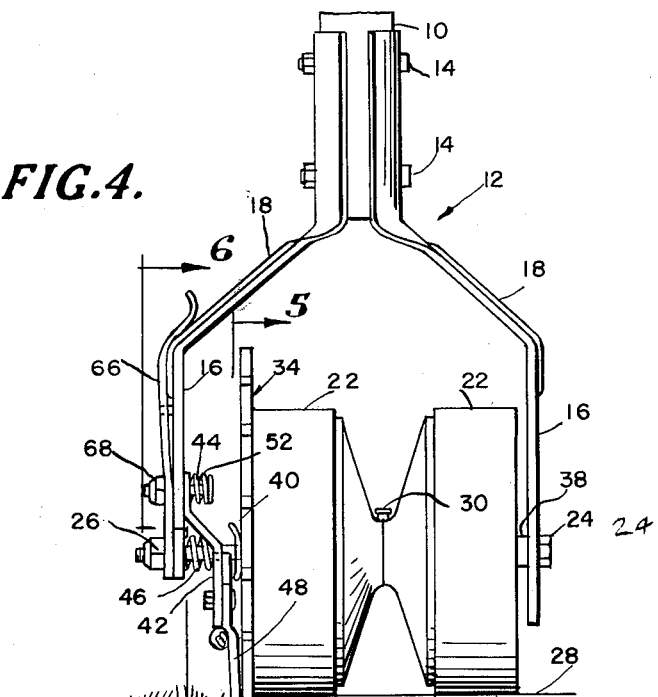
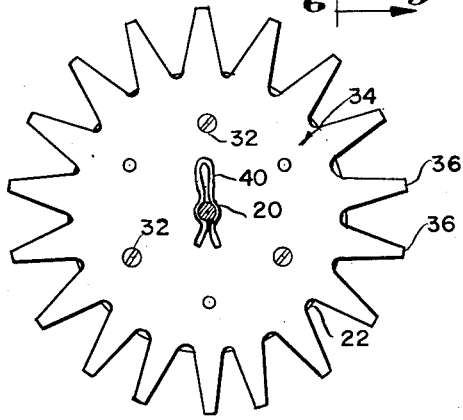
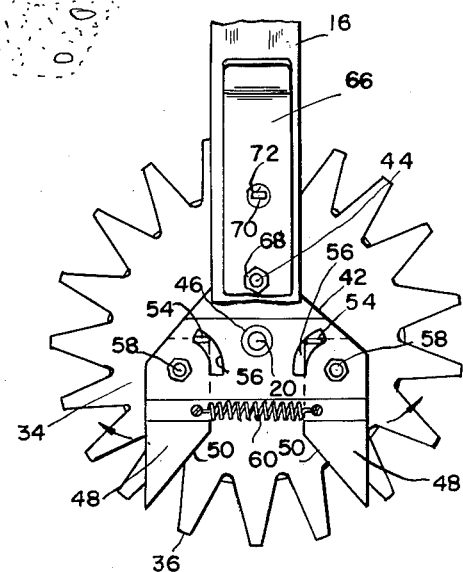
INVENTOR
EARL L. CHADWICK 3,047,999
ROTO-EDGER TOOL
Earl L. Chadwick, Portland, Oreg., assignor to McDonough Company, Parkersburg, W. Va., a corporation
Filed Jan. 21, 1960, Ser. No. 3,909
4 Claims. (Cl. 56—256)

This invention relates to a lawn and garden tool for edging, trimming and shearing grass along the edges of sidewalks, driveways, gardens, and the like. More particularly, this invention relates to improvements in the tools disclosed in my prior Patent No. 2,660,854 and in the patent to Carlton No. 2,844,934.

Trimming devices or tools of the type disclosed in the above patents have been quite satisfactory for their intended purpose. However, one difficulty arising from the use of such lawn trimmers is that of the fixed shearing blade encountering an obstruction, such as a rock or a root, during the trimming operation. Not only does such an encounter tend to damage the blade but also causes some discomfort to the operator. In particular, with the shearing blade rigidly mounted to the lawn trimmer, the handle of the lawn trimmer tends to pivot away from the operator when an obstruction is struck by the blade. The present invention reduces the possibility both of damage to the blade and discomfort to the operator by pivotally mounting the shearing blade so that it will yield on encountering an obstruction and then will tend to ride thereover and be restored to its operative trimming position without affording any appreciable degree of discomfort to the operator.

It is an object, therefore, of this invention to provide an improved lawn and garden trimmer having means for yieldably mounting the shearing blade so that it may move relative to the tool when encountering an obstruction.

It is another object of this invention to provide an improved lawn and garden trimmer having means for better maintaining the shearing elements in effective engagement.

These and further objects and advantages will be readily apparent to those skilled in the art from the following detailed description taken in conjunction with the appended drawings, in which:

FIGURE 4 is an end elevational view of the tool taken from the right-hand side of FIG. 1;

FIGURE 5 is a sectional view taken along line 5—5 of FIG. 4; and

FIGURE 6 is a sectional view taken substantially along the line 6—6 of FIG. 4.

Figure 1:
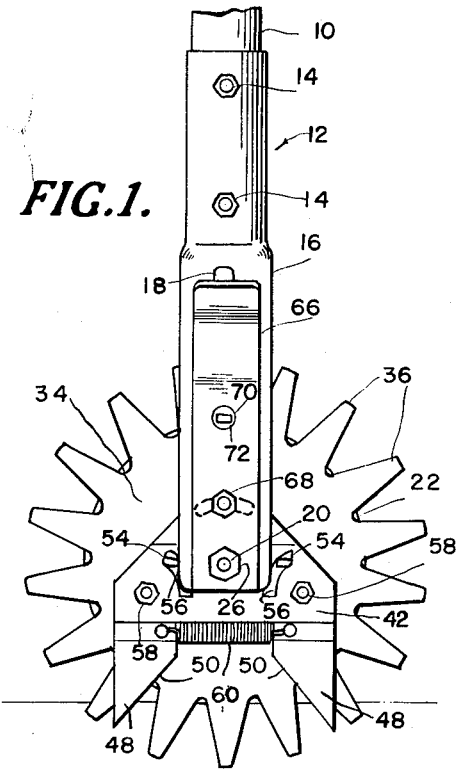
FIGURE 1 is a side elevational view of a tool embodying the features of this invention.

Referring now to the drawings, the preferred embodiment of the garden and lawn edging tool of this invention has an elongated handle 10 which may be of any desired construction and preferably of such length that an operator may use the tool while in a substantially upright position. Connected to one end of the handle 10 is a forked bracket 12 which is secured to the handle by any suitable means, such as the bolts 14. The two spaced legs 16 of the bracket 12 are suitably bent outwardly and downwardly so that their lower portions extend substantially parallel to and in the same plane as the handle 10. The legs 16 preferably are reinforced, as by an integral rib 18, or by an additional plate member (not shown) welded or otherwise rigidly secured thereto. Secured to and between the lower ends of the legs 16 is an axle 20 which, for purposes of illustration, is shown as a bolt having a head 24 on one end and a nut 26 on the other.

Rotatably mounted upon the axle 20 are a pair of spaced rubber tired wheels 22 adapted to ride along the surface of the ground or sidewalk 28 (FIG. 4) and to support and drive part of the shearing elements of the tool. The wheels 22 are connected together for rotation as a unit and, preferably, are provided with a lubricant aperture 30 so that bearing surfaces between the wheels and the axle 20 may be lubricated to provide a smooth and efficiently operative device. A substantially flat shearing disc 34 is secured to the outer face of the inner wheel 22, as by screws 32, and has a plurality of radially extending shearing teeth 36 about its periphery. The shearing disc 34, being rigidly secured to the wheel 22, rotates therewith as it rides along the surface 28.

The wheels 22 are maintained off-center relative to the handle closely against one of the legs 16 and, together with the disc 34, are prevented from axial movement along the axle 20 by any suitable construction, such as a spring clip 40 engaged in a circumferential groove in the axle 20 and bearing against the face of the disc 34. Preferably, a spacer washer 38 is mounted on the axle 20 between the other side of the wheels and the adjacent leg 16.

Loosely pivotally mounted on the axle 20 between the shearing disc 34 and the adjacent leg 16 is a plate 42. As shown in FIG. 4, a coil compression spring 46 interposed between the leg 16 and the plate 42 constantly urges the latter inwardly along axle 20 toward the face of the shearing disc 34. The upper portion of the plate 42 is bent outwardly to lie against the leg 16 and is urged thereagainst by a coil compression spring 52 interposed between the plate and the head of a bolt 44 which extends through the plate 42 and through an arcuate slot 64 in the leg. The lower portion of the plate 42 extends substantially parallel to the face of shearing disc 34 and has a pair of opposed shearing blades 48 pivotally secured thereto so that their lower extremities and opposed cutting edges 50 are in engagement with the face of shearing disc 34 to cooperate with the peripheral teeth 36 thereon to effect the cutting or shearing of grass. Two blades are provided so that the tool may be operated in either direction, but with only one blade operative at a time. In the event that an object becomes jammed between the opposed faces of the blades 48 and the teeth 36, the springs 46 and 52 will yield and permit the plate 42 to rock on the axle 20 about a transverse axis to avoid damage to the blades and teeth and also to assist in dislodging the object.

As shown more in detail in the aforementioned patent to Carlton, the tool preferably is provided with means to adjust the angle of the blades 48 relative to the handle 10, and consequently, to the earth when the tool is in operation. For this purpose the bolt 44 is connected, by a nut 68, to an adjusting lever 66 pivotally mounted on the axle 20 between the nut 26 and the adjacent leg 16. Movement of the lever 66 will serve to adjust the angle of the blades 48, as shown best in FIG. 3, and the lever can be retained in its adjusted positions by a detent arrangement which includes a projection 70 on the leg and a cooperating aperture 72 on the lever, as described more in detail in the aforementioned patent to Carlton.

Figure 2:
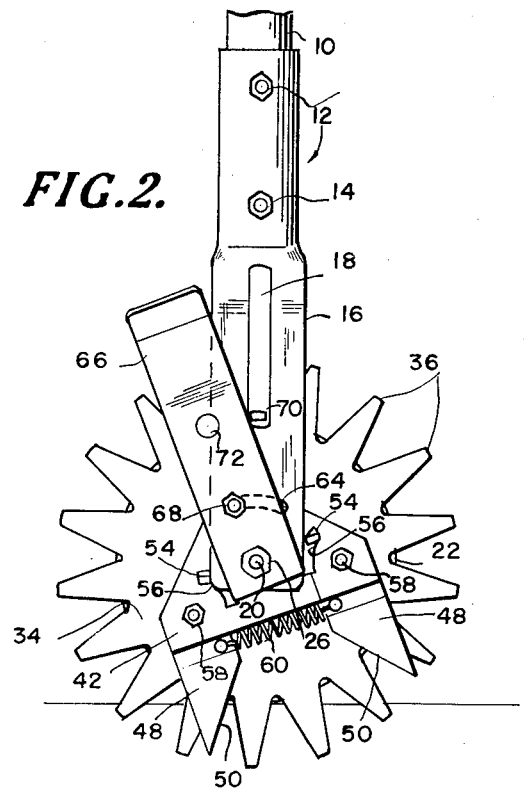
FIGURE 2 is a view corresponding to FIG. 1 but showing the fixed shearing blade in an adjusted position.
Figure 3:
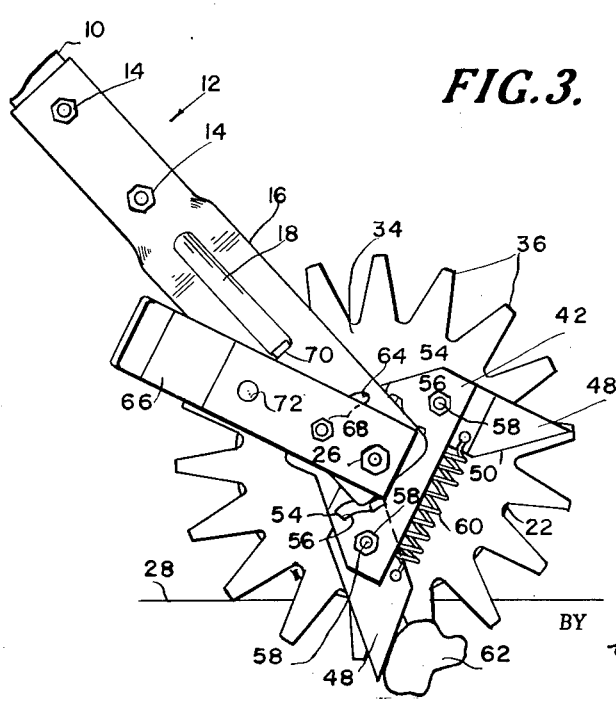
FIGURE 3 is a view corresponding to FIG. 2 but showing the handle of the tool inclined to its normal operative position and showing the action of one of the shear blades when encountering an obstruction.

Each shearing blade 48 has an outwardly extending lug 54 which rides within an arcuate slot 56 in plate 42, so that the ends of the slot limit the pivotal motion of the blade 48. A coil spring 60 connects the blades 48 together and continuously urges them toward each other and into their normal position of operation. If during the trimming operation the operative blade 48 encounters an obstruction 62, as shown in FIGURE 3, such will yield and pivot rearwardly against the action of coil spring 60. If the object 62 is sufficiently small or is embedded deeply enough, the pivotal action of blade 48 relative to plate 42 probably will be sufficient enough to allow the tool to pass over the object 62 without the operator being aware of its presence. However, if the object is large or is not deeply embedded, the yielding action of blade 48 probably will not be sufficient to allow the free overpassage of the tool, but will serve as a shock-absorber to not only prevent damage to the blade but also prevent a severe jolt to the operator. In such a case he need only raise the tool over the object and continue on with his shearing or cutting action. As soon as the pivoted blade 48 passes over the embedded object 62, the coil spring 60 will immediately restore the pivoted blade to its normal shearing position (FIGURES 1 and 2).

It will thus be seen that there has been provided by this invention a device in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative and not in a limiting sense.

I claim:

1. A lawn and garden edging tool comprising: a handle; a bracket secured to one end of said handle and having a leg extending generally parallel to said handle; a transverse axle carried by said bracket; a rotatable ground-engaging wheel mounted on said axle; a shearing disc coaxially mounted on said axle between said bracket leg and said wheel and fixed to the latter for rotation therewith, said disc having a plurality of peripheral shearing teeth; a plate mounted between said disc and leg for pivotal adjustment about the axis of said axle; detent means associated with said bracket and plate for retaining the latter in its adjusted positions; a pair of shearing blades pivotally mounted on said plate for cooperation with said shearing disc, said blades being alternatively operable depending upon the direction of movement of said tool; spring means cooperating with said bracket and plate to urge said blades into operative engagement with said disc; and additional spring means connected to and between said blades to maintain the latter in a normal operative position but allow each to yield and pivot rearwardly relative to the direction of movement of said tool on encountering an obstruction.

2. The structure defined in claim 1 including interengageable means on the plate and on the shearing blade to limit the extent of pivotal movement of the latter relative to the former.

3. In a lawn and garden tool for edging, trimming and shearing grass or the like, the combination comprising: a handle; a bracket having a leg extending generally parallel to said handle; a transverse axle carried by said bracket; a rotatable ground-engaging wheel mounted on said axle; a shearing disc coaxially mounted on said axle between said bracket leg and said wheel and fixed to the latter for rotation therewith, said disc having a plurality of peripheral shearing teeth; a shear plate mounted between said disc and said bracket leg and extending on opposite sides of said axle as respects said handle, said plate having an over-size opening accommodating said axle and for pivotal movement of said plate thereon about an axis transverse thereto; a shearing blade on said plate on the side of said axle opposite said handle for cooperation with said shearing teeth; means fastening a portion of said plate on the other side of said axle to said bracket leg for pivotal movement of said plate about said axis; resilient means associated with said fastening means for yieldably urging said plate portion against said bracket leg; resilient means on said axle interposed between said bracket leg and said plate for urging said blade against said shearing teeth; and stop means on said axle engaged by said wheel for restraining the latter against axial movement on said axle toward said plate.

4. In a lawn and garden tool for edging, trimming and shearing grass or the like, the combination comprising: a handle; a bracket carried thereby at one end thereof, said bracket having a leg extending generally parallel to said handle; a transverse axle carried by said bracket; a rotatable ground-engaging wheel mounted on said axle; a shearing disc coaxially mounted on said axle between said bracket and said wheel and fixed to the latter for rotation therewith, said disc having a plurality of shearing teeth at the periphery thereof; a shear plate mounted between said disc and said bracket; means engaged with said plate and said bracket for normally restraining said plate against pivotal movement about the axis of said axle; a pair of shearing blades pivotally mounted on said plate on the side of said axle opposite said handle for cooperation with said shearing teeth, said blades being alternatively operable depending upon the direction of movement of said tool; and spring means connected to and between said blades for maintaining the latter in a normal operative position but to allow the operative blade to yield and pivot rearwardly, relative to the direction of movement of said tool, on encountering an obstruction.

References Cited in the file of this patent

UNITED STATES PATENTS

| 2,212,057 | Waller | Aug. 20, 1940 |
| 2,626,499 | Wick | Jan. 27, 1953 |
| 2,660,854 | Chadwick | Dec. 1, 1953 |
| 2,844,934 | Carlton | July 29, 1958 |